(12) United States Patent
Kollmann

(10) Patent No.: US 7,126,238 B2
(45) Date of Patent: *Oct. 24, 2006

(54) METHOD AND DEVICE FOR DRIVING AN ELECTRIC ACTUATOR UNIT

(75) Inventor: Norbert Kollmann, Gifthorn (AT)

(73) Assignee: Siemens Aktiengesellschaft, Munich (DE)

( * ) Notice: Subject to any disclaimer, the term of this patent is extended or adjusted under 35 U.S.C. 154(b) by 206 days.

This patent is subject to a terminal disclaimer.

(21) Appl. No.: 10/828,008

(22) Filed: Apr. 20, 2004

(65) Prior Publication Data

US 2004/0239185 A1 Dec. 2, 2004

Related U.S. Application Data

(63) Continuation of application No. 09/781,140, filed on Feb. 12, 2001, now Pat. No. 6,784,631.

(30) Foreign Application Priority Data

Nov. 2, 2000 (DE) ................................ 100 06 234

(51) Int. Cl.
*B60L 1/00* (2006.01)

(52) U.S. Cl. .................... 307/9.1; 307/10.1; 307/10.3; 307/10.6

(58) Field of Classification Search ................. 307/9.1, 307/10.1, 10.3, 10.6
See application file for complete search history.

(56) References Cited

U.S. PATENT DOCUMENTS

| | | | | |
|---|---|---|---|---|
| 4,332,306 | A | 6/1982 | Turatti | 180/287 |
| 4,895,216 | A | 1/1990 | Fusimi et al. | 180/404 |
| 4,910,445 | A * | 3/1990 | Borrmann | 318/468 |
| 5,117,664 | A | 6/1992 | Kurozu et al. | 70/186 |
| 5,763,957 | A * | 6/1998 | Kusunoki | 307/10.2 |
| 5,764,009 | A * | 6/1998 | Fukaya et al. | 318/300 |
| 5,835,868 | A | 11/1998 | McElroy et al. | 701/2 |
| 6,298,941 | B1 | 10/2001 | Spadafora | 180/422 |

* cited by examiner

*Primary Examiner*—Robert L. DeBeradinis
(74) *Attorney, Agent, or Firm*—Baker Botts L.L.P.

(57) ABSTRACT

A system for driving an electric actuator unit with a polarity-dependent actuation direction contains a driving unit with a voltage input, at least one polarity control input and two voltage outputs whose polarity depends on the polarity control signal at the polarity control input, and a control input. The actuator unit is operated in at least one of the drive directions only if a corresponding polarity control signal is present and the control input is additionally supplied with a predefined control signal.

6 Claims, 2 Drawing Sheets

METHOD AND DEVICE FOR DRIVING AN ELECTRIC ACTUATOR UNIT

This application is a continuation of Ser. No. 09/781,140 filed Feb. 12, 2001, now U.S. Pat. No. 6,784,631. The entire disclosure of the prior applications are considered as being part of the disclosure of the accompanying application and are hereby incorporated by reference therein by their entireties.

FIELD OF THE INVENTION

The invention generally relates to a method for driving an electric actuator unit and more particularly relates to a device for driving an electric actuator unit by means of a driving unit.

BACKGROUND OF THE INVENTION

In modern motor vehicles, use is increasingly being made of electric actuator devices which must fulfill stringent safety requirements. For example in the case of an electric steering lock, the device must never lock while the vehicle is traveling.

OBJECTS AND SUMMARY OF THE INVENTION

An object of the invention is to drive an electric actuator device in such a way that a maximum degree of safety against inadvertent or incorrect driving of the actuator is achieved.

A method for achieving the object of the invention includes supplying an actuator unit having a voltage with a polarity which is dependent on the actuation direction with the result that the actuation direction can be reliably predefined. Furthermore, the actuator unit whose actuation direction is predefined by the polarity of the voltage which is supplied, at least in one of the actuation directions, is activated only if a further condition is fulfilled. This further condition can be, for example, in the case of an actuator unit designed for a steering mechanism lock, the fact that a stationary state of the vehicle is detected.

When the actuator unit is used for a steering lock, it is then actuated in such a way that it is effective in the direction of locking the steering only if it is supplied with voltage with a polarity which brings about actuation in the direction of locking the steering, and if, in addition, a signal indicating a stationary state of the vehicle is present.

The present invention can be applied wherever electric actuator units are to be actuated with a particularly high level of reliability. In particular, it can be used for motor vehicles where it should be possible to actuate numerous electric actuator devices only if specific travel state conditions are fulfilled and/or specific operating states are present.

BRIEF DESCRIPTION OF THE DRAWINGS

The invention is explained below in more detail, by way of example, with reference to schematic drawings, in which.

DETAILED DESCRIPTION OF PREFERRED EMBODIMENTS

Figure 1:
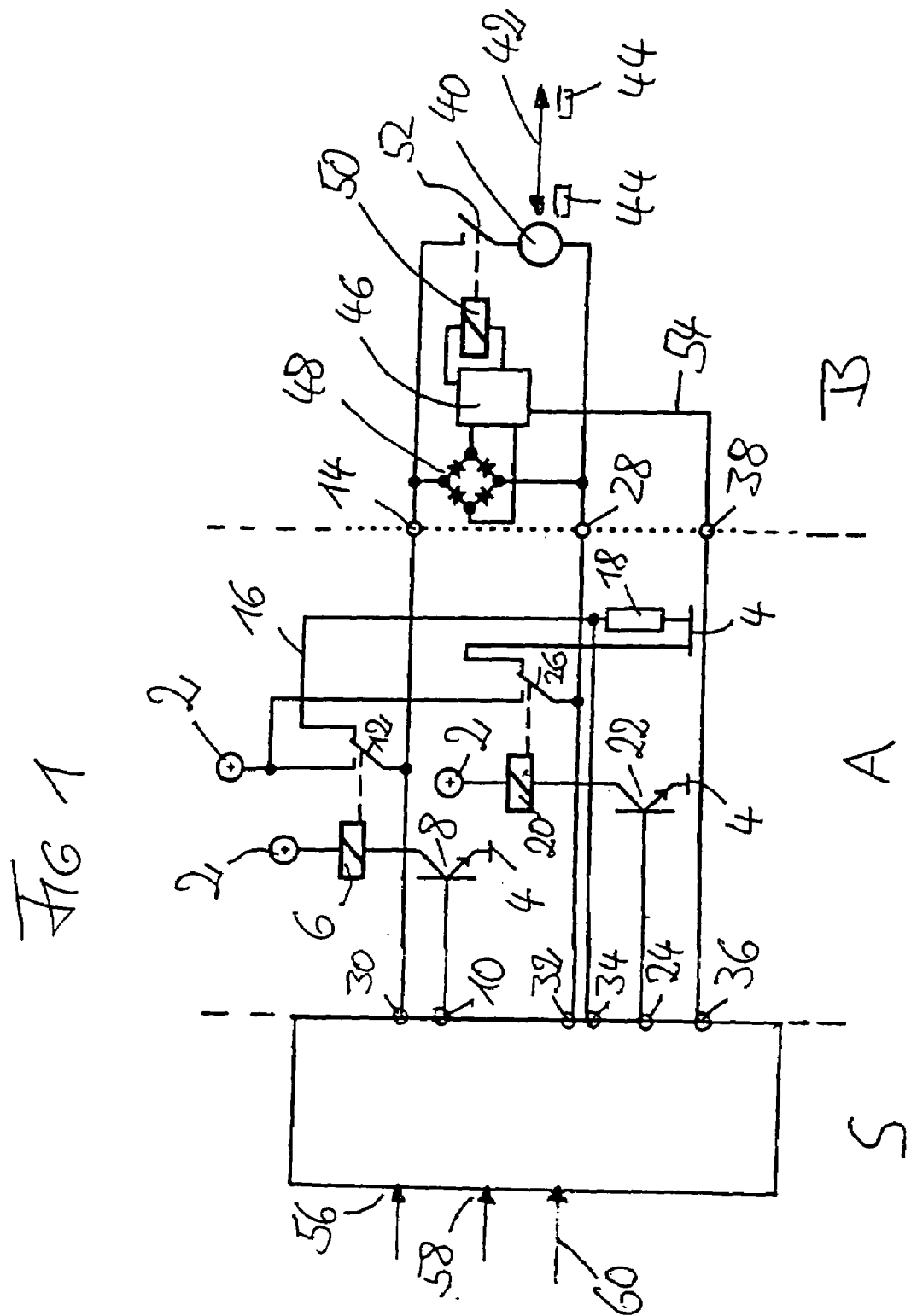
FIG. 1 is a simplified circuit diagram of a system having a driving unit and an actuator unit.

Referring to FIG. 1, a system for driving an electric actuator unit B contains a control unit S and a driving unit A. The design of the driving unit A will be described first.

The driving unit A contains a voltage input 2 to which a voltage supply is connected. The voltage input 2 appears several times in the figure and it is possible to connect the voltage inputs 2 together and feed them, for example, from a battery. Furthermore, the driving unit A contains ground terminals 4, which can also be connected together to a common terminal. A line leads from the voltage input 2 via a relay coil 6 to an electronic switch 8 which is embodied, for example, as a transistor. A control electrode (base) of electronic switch 8 is connected to a first control terminal 10 of the control unit S.

The relay coil 6 actuates a change-over switch 12 which in one position connects the voltage input 2 to a first voltage output 14 and in a second position connects the voltage output 14 to the ground terminal 4 via a line 16 and a measuring resistor 18. The terminal of the measuring resistor 18 which is remote from the ground is connected to a ground terminal 34 of control unit S and to ground 4 via a line.

A further relay coil 20 connects the voltage terminal 2 to an electronic switch 22 which control electrode is connected to a further control input 24 of control unit S. A change-over switch 26 which is actuated by the relay coil 20 connects, in one position, the voltage input 2 to a further voltage output 28, and in the position illustrated, connects the voltage output 28 to ground 4.

A line leads from the voltage output 14 to a diagnostic terminal 30 of control unit S. A line leads from the voltage output 28 to a further diagnostic terminal 32 of control unit S. Furthermore, a control input 36 which is connected to a control output 38 is provided.

As illustrated, the voltage outputs 14 and 28 of the driving unit A form corresponding voltage inputs of the actuator unit B and are connected thereto. Likewise, the control output 38 of the driving unit A forms a control input of the actuator unit B. The actuator unit B has an electric motor 40 the operating direction of which depends on the polarity of the voltage applied to the inputs 14 and 28. The electric motor 40 displaces, for example, a locking bolt 42 in one direction or the other depending on its direction of rotation. The end positions of the locking bolt 42 are sensed by position sensors 44, such as Hall-effect sensors.

An electronic unit 46 is connected to the voltage outputs 14 and 28 via a rectifier bridge 48, with the result that the voltage supply of the electronic unit 46 is ensured irrespective of the polarity of the voltage present at the voltage outputs. A relay coil 50 is connected downstream of the electronic unit 46 and actuates a switch 52 which lies in the power supply path of the electric motor 40.

A control line 54, which is advantageously embodied or connected as a bidirectional data line, leads from the control output 38 to the electronic unit 46.

The control unit S has connections for the described terminals 30, 10, 32, 34, 24 and 36 and inputs 56, 58 and 60. A signal is present at the input 56 when the vehicle is in a stationary state. In the "ignition on" state a signal is present at the input 58 and a diagnostic signal can be applied to the input 60.

The control unit S may be embodied as a control unit containing, if appropriate, a microprocessor with associated memories. The control unit operates under the control of logic on software in such a way that signals which depend on the signals applied to the inputs are present in particular at the outputs of said control unit S which correspond to the control input 10, the control input 24 and the control input 36.

Figure 2:
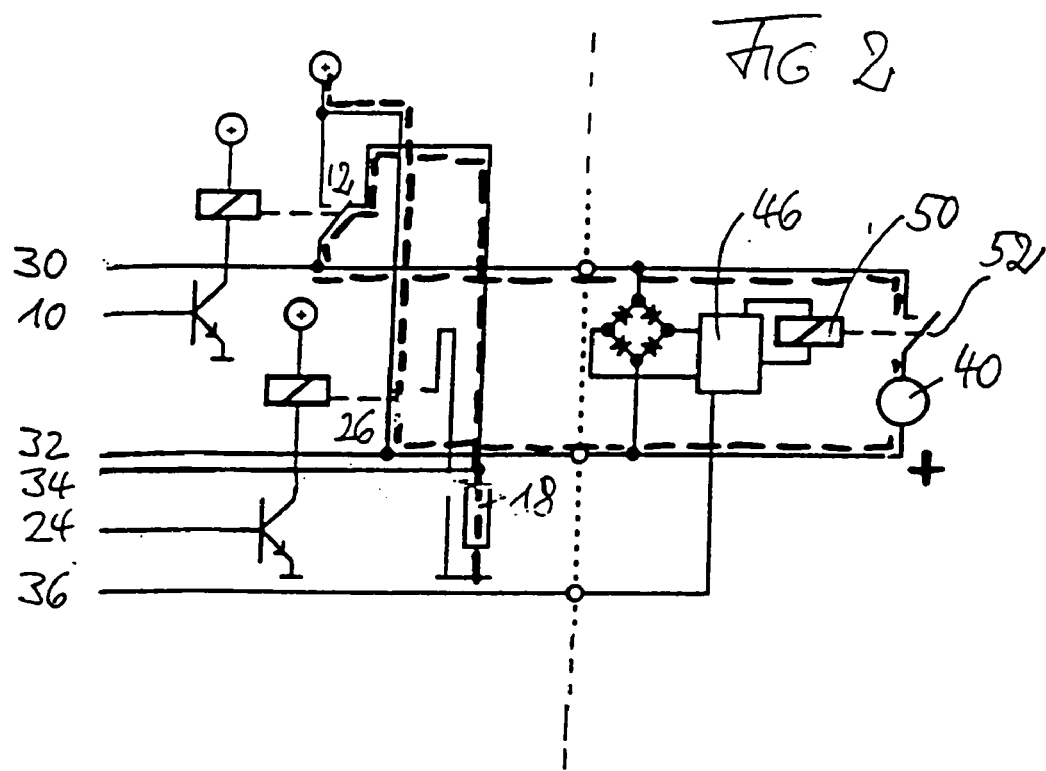
FIGS. 2 and 3 are circuit diagrams illustrating the method of operation of the circuit according to FIG. 1 in two different switched states.

It will be assumed in the first instance that an "ignition on" signal is present at the input 58. This "ignition on" signal causes the control input 10 to remain deactivated, i.e. the relay coil 6 does not attract the change-over switch 12, with the result that the change-over switch 12 remains in the position illustrated in FIG. 1 and a signal is generated at the control output 24 which switches the electronic switch 22 to a conductive position so that the relay coil 20 moves the change-over switch 26 into the position shown in FIG. 2. As is clear from FIG. 2, the polarity of this voltage present at the electric motor 40 is such that the pole located at the bottom according to FIG. 2 is the positive pole. This arrangement of the poles of the electric motor 40 corresponds to a direction of rotation in which the locking bolt 42 (FIG. 1) is moved in a direction which releases the steering mechanism (column).

When the signal "ignition on" is present at the input 58, a signal or a serial pulse sequence is additionally generated at the control output 36. This signal or serial pulse sequence causes the relay coil 50 in the electronic unit 46 to be activated, with the result that the switch 52 is closed and the electric motor 40 moves the locking bolt into the position which releases the steering column. An end position of the release bolt is detected by the associated position sensor 44 which is connected to the electronic unit 46 (lines not illustrated) and triggers a signal in the electronic unit 46. This signal is transmitted to the control unit S via the bidirectional control line 54 and displays the release of the steering column. The release of the bolt or of the line is the "nonhazardous" state with respect to the lock so that in the present case only the "ignition on" signal is used.

Figure 3:
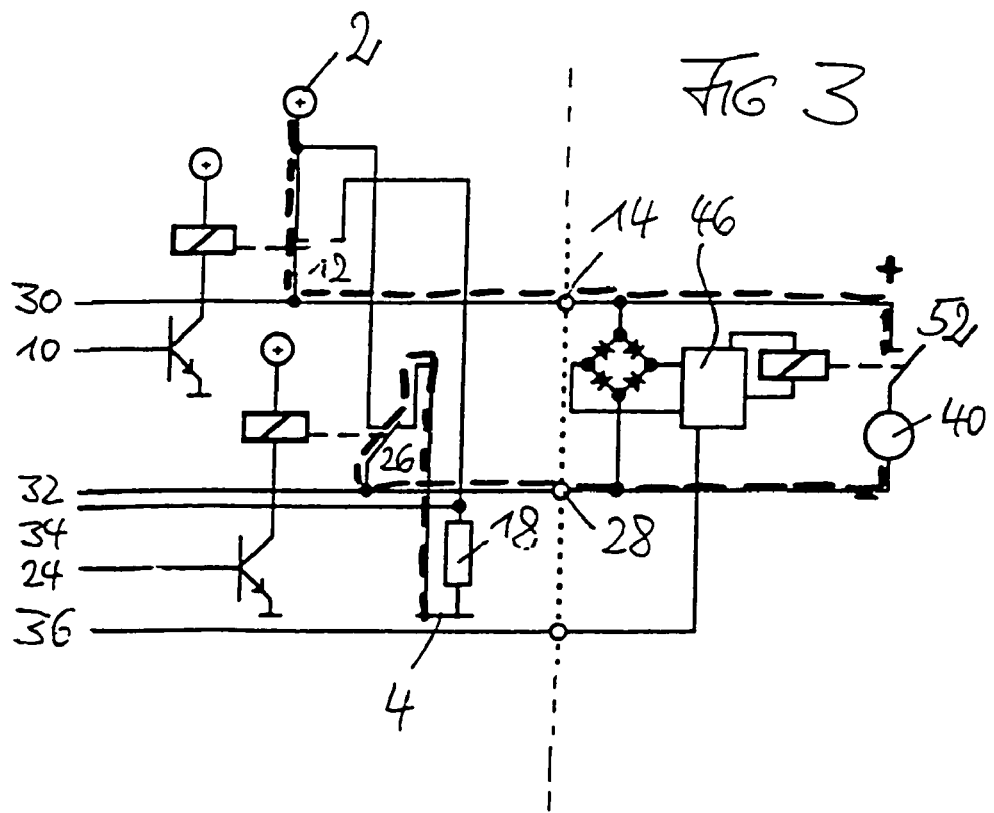

FIG. 3 shows the circuit state in a situation where a signal which indicates a stationary state of the vehicle is present at the input 56 of the control unit, and a signal which signifies "ignition off" is applied to the input 58. The "ignition off" signal at the input 58 causes the change-over switch 12 to connect the voltage input 2 to the voltage output 14, as in FIG. 3. The change-over switch 26 remains in the position as in FIG. 1 in which it connects the voltage output 28 to ground 4. The arrangement of the poles of the electric motor 40 is then such that the positive pole is located at the top according to FIG. 3, i.e., the electric motor operates in the direction to lock the steering column. The "vehicle stationary state" signal at the input 56 causes the control unit S to transmit a signal to the electronic unit 46 via the control input 36. In response to this signal, the electronic unit 46 closes the switch 52, with the result that the electric motor 40 moves the locking element into the position which locks the steering column. In a way similar to the release position, the lock position can be detected by activating the respective position sensor 44 and generating a locking signal in the electronic unit 46.

For diagnostic purposes, when the input 60 is supplied with a diagnostic signal, the change-over switches can be switched as illustrated in FIG. 2 at all times, i.e., the steering column is released. The power drain of the electric motor 40 can be measured by measuring the voltage across resistor 18 and terminal 34, and comparing this voltage with a setpoint value. Furthermore, the voltages at the diagnostic terminals can be used to determine whether a change-over switch or a relay is sticking or otherwise not functioning satisfactorily.

In summary, the invention uses only three interfaces connections (14, 28 and 38) between the driving unit A and the actuator unit B. The actuator unit may be spatially remote from the driving unit A and still achieve reliable and largely failsafe actuation of the actuator unit B. This arrangement also permits diagnostics to be performed.

The system described can be modified in various ways. For example, the driving unit A may be a component of the control unit S. The relay switches can be replaced by other types of electronic switches. The interfaces 14, 28 and 38 may be galvanically isolated. The electric motor 40 may be a solenoid or a hydraulic unit driven by a magnet. The relay coil 50 may be combined with the switch 52 to form an electronic switch, for example a transistor. Further information relating to the actuator unit B can be transmitted to the control unit S via the bidirectional line 54.

One of the control inputs 10 or 24 may be dispensed with if the switches 12, 26 arranged downstream are switched in such a way that when signals are supplied to the single control input the switches go, for example, into the positions according to FIG. 2, and into the positions in FIG. 3 when there is no signal.

The control unit S can have a plurality of inputs which input signals are converted into the respective supply configuration of the outputs according to requirements.

An alternative to the procedure described with reference to FIGS. 2 and 3, the procedure is when the ignition key is inserted into the ignition lock or when the operator begins to turn it, the polarity is switched to the "release" actuation direction. The edge of an "ignition on" signal then causes a release or activation signal to be transmitted via the control line 54. In this way the line is released more quickly.

The polarity for the "lock" actuation direction can, like the activation signal, be switched only if both conditions "ignition off" and vehicle stationary state are fulfilled. For the activation signal it is possible for additional conditions to be required, such as ignition key removed from lock etc.

What is claimed is:

1. A device for driving an electric actuator unit, comprising:
   a driving unit comprising:
      a voltage supply input;
      first and second polarity control inputs; and
      at least two voltage outputs, the polarity of a signal at the voltage outputs depending on the supplying of the at least one polarity control input with the voltage supply input and the at least one polarity control input control input;
   wherein the first and second polarity control inputs actuate first and second change-over switches, respectively, the first change-over switch connecting, in the signal-less state of the associated polarity control input, a first of said at least two voltage outputs to ground via a measuring resistor and to the voltage input in the state in which a signal is supplied; and
   the second change-over switch connecting, in the signal-less state of the associated polarity control input, the second of said at least two voltage outputs to ground, and to the voltage input in the state in which a signal is supplied;
   wherein the actuator unit comprises a drive motor and at least two voltage inputs which are operatively coupled to said at least two voltage outputs, the drive direction of the drive motor being determined by the polarity of the signal at the at least two voltage inputs and the drive motor being operated in at least one of the drive directions only when the control input is supplied with a predefined control signal; and wherein it is possible to carry out a diagnosis of the system in one position of the first and second change-over switches in which the measuring resistor has current flowing through it when the drive motor is supplied with voltage.

2. The device as claimed in claim 1, wherein the driving unit has a control output which is connected to the control input, and the actuator device has a second control input which is connected to the control output and is connected to an electronic unit which operates the drive motor.

3. The device as claimed in claim 2, wherein the electronic unit is connected, for its voltage supply, to at least two voltage inputs of the actuator unit via a rectifier bridge.

4. The device as claimed in claim 1, wherein it is possible to carry out a diagnosis of the system in the state in which the drive motor is supplied with voltage in the direction of releasing the steering mechanism.

5. A device for driving an electric actuator unit, comprising:
- a driving unit comprising:
  - a voltage supply input;
  - at least one polarity control input;
  - at least two voltage outputs, the polarity of a signal at the voltage outputs depending on the supplying of the at least one polarity control input with a signal and a control input; and wherein the actuator unit comprises a drive motor and at least two voltage inputs which are operatively coupled to said at least two voltage outputs, the drive direction of the drive motor being determined by the polarity of the signal at the at least two voltage inputs and the drive motor being operated in at least one of the drive directions only when the control input is supplied with a predefined control signal; and further wherein the actuator unit is a unit for locking the steering mechanism electrically in a motor vehicle, and the drive motor for locking the steering mechanism is capable of being operated only if the control input is supplied with a signal which signals a stationary state of the vehicle.

6. The device as claimed in claim 5, wherein it is possible to carry out a diagnosis of the system in the state in which the drive motor is supplied with voltage in the direction of releasing the steering mechanism.

* * * * *